Patented Mar. 19, 1935

1,994,633

UNITED STATES PATENT OFFICE 1,994,633

SOLUTION AND METHOD FOR REMOVING SILVER FROM THE BACK OF MIRRORS

Samuel Smith Boyd, Louisville, Ky.

No Drawing. Application November 29, 1933, Serial No. 700,360

8 Claims. (Cl. 75—18)

My invention relates to a solution for removing silver from the back of mirrors and the method of removing same by the use of said solution.

Because of deterioration or defective workmanship the silver coating on the back of mirrors must be removed for the purpose of recoating or resilvering the same. Prior to my invention this silver was removed by the use of nitric acid or lye and scraping the silver off the glass by means of a stick or other object. This system involved comparatively a large amount of labor, caused permanent streaks on the glass called in the trade "hair lines" and the silver is wasted and rendered inoperative of further use.

An object of my invention is to perform this necessary function of removing the silver without any of the aforesaid undesirable factors. In the use of my invention comparatively little labor is involved, no streaks or "hair lines" are caused and the silver taken off is reclaimed and may be reused.

To obtain the above and other objects I have devised a solution comprising tartaric acid, muriatic acid and water. The mirror to be stripped is placed in the solution for perhaps forty-five minutes, whereby the silver by reason of the mere immersion in said solution is removed from the glass. The mirror is removed from the solution, dried and the silver is deposited as a sediment in said solution. By merely straining the solution the silver is reclaimed. Upon drying the glass forming the mirror it is ready for resilvering.

So far as I know there is no chemical reaction between the various ingredients of the solution. As to the percentages, the proportions or relative parts of the ingredients of my solution, I have found that the same can be varied with more or less satisfactory results, depending upon the strength of the solution desired. By reducing the relative parts of muriatic acid the solution is weakened.

I prefer to use the ingredients in the solution in the following approximate proportions by volume: one part tartaric acid, sixteen parts muriatic acid and six parts water. I also find that instead of the sixteen parts muriatic acid I may in lieu thereof use about thirteen parts muriatic acid and three parts nitric acid. What may be termed a "weaker" solution may be in approximately the following parts by volume: one part tartartic acid, three parts nitric acid, nine parts muriatic acid and eleven parts water. This solution gives substantially the same results but requires a little longer time to obtain substantially the same results.

I find that nitric acid is a dispensable element of my invention but that it may be used in conjunction with muriatic acid. As I have above indicated the proportions of muriatic acid are reduced to the approximately same extent as the parts of nitric acid are added.

I distinctly do not confine myself to the specific proportions indicated but I claim the solution involving the ingredients as stated.

What I claim as new and desire to secure by Letters Patent is:

1. A solution for removing silver from the back of mirrors comprising muriatic acid, tartaric acid and water.

2. A solution for removing silver from the back of mirrors comprising muriatic acid, tartaric acid, nitric acid and water.

3. A solution for removing silver from the back of mirrors comprising about one part of tartaric acid, thirteen parts muriatic acid, there parts of nitric acid and six parts of water.

4. A solution for removing silver from the back of mirrors comprising about one part of tartaric acid, sixteen parts of muriatic acid and six parts of water.

5. The herein described method of removing silver from the back of mirrors which consists in the step of preparing a solution for removing silver from the back of mirrors comprising muriatic acid, tartaric acid and water; depositing the mirror to be acted upon in said solution; removing said mirror and wiping the said mirror to remove the solution.

6. The herein described method of removing silver from the back of mirrors which consists in the step of preparing a solution comprising muriatic acid, tartaric acid, nitric acid and water; depositing the mirror to be acted upon in said solution; removing said mirror and wiping the same to remove the solution.

7. The herein described method of removing silver from the back of mirrors which consists in the step of preparing a solution comprising muriatic acid, tartaric acid and water; depositing the mirror to be acted upon in said solution; removing said mirror and drying the same for the purpose of removing the solution; and straining the said solution for the purpose of reclaiming the silver which has been separated from the mirror.

8. The herein described method of removing silver from the back of mirrors which consists in the step of preparing a solution comprising muriatic acid, tartaric acid, nitric acid and water; depositing the mirror to be acted upon in said solution; removing said mirror; drying the mirror to remove the solution; and straining the said solution for the purpose of reclaiming the silver which has been separated from the mirror.

SAMUEL SMITH BOYD.